United States Patent [19]
Ito et al.

[11] Patent Number: 5,447,670
[45] Date of Patent: Sep. 5, 1995

[54] METHOD OF AND APPARATUS FOR FORMING WEATHER STRIP BY EXTRUSION

[75] Inventors: Masaru Ito; Keizo Hayashi; Hiroyasu Kozawa, all of Aichi, Japan

[73] Assignee: Toyoda Gosei Co., Ltd., Tokyo, Japan

[21] Appl. No.: 223,861

[22] Filed: Apr. 6, 1994

[30] Foreign Application Priority Data

| Apr. 28, 1993 | [JP] | Japan | 5-102565 |
| Apr. 28, 1993 | [JP] | Japan | 5-102566 |
| Oct. 29, 1993 | [JP] | Japan | 5-272577 |
| Oct. 29, 1993 | [JP] | Japan | 5-272578 |

[51] Int. Cl.⁶ .................. B29C 47/16; B29C 47/92
[52] U.S. Cl. ................... 264/146; 264/40.5; 264/40.7; 264/167; 264/177.16; 264/177.17; 425/131.1; 425/307; 425/313; 425/381; 425/466; 425/145
[58] Field of Search .......... 264/177.16–177.2, 264/177.10, 145, 146, 167, 40.5, 40.7; 425/131.1, 465, 466, 381, 308, 313, 307, 315, 296, 316, 142, 145

[56] References Cited

U.S. PATENT DOCUMENTS

| 4,425,289 | 1/1984 | Lee et al. | 264/40.7 |
| 4,584,150 | 4/1986 | Ballocca | 264/167 |
| 4,765,936 | 8/1988 | Ballocca . | |
| 4,861,530 | 8/1989 | Zaccaria | 264/167 |
| 4,865,676 | 9/1989 | Kimura et al. | 264/177.17 |
| 4,865,796 | 9/1989 | Tamura et al. | 264/177.17 |
| 4,918,867 | 4/1990 | Hayashi et al. . | |
| 4,960,375 | 10/1990 | Saito et al. | 264/177.16 |
| 5,099,612 | 3/1992 | Hayashi et al. . | |
| 5,112,547 | 5/1992 | Nakashima et al. | 264/177.1 |
| 5,174,845 | 12/1992 | Petty | 156/244.15 |
| 5,183,522 | 2/1993 | Arima . | |
| 5,240,664 | 8/1993 | Hayashi et al. | 264/177.17 |
| 5,281,291 | 1/1994 | Yada et al. | 264/145 |

FOREIGN PATENT DOCUMENTS

| 0081093 | 6/1983 | European Pat. Off. . | |
| 0325828 | 8/1989 | European Pat. Off. . | |
| 3609099 | 11/1986 | Germany . | |
| 59-70528 | 4/1984 | Japan | 264/167 |
| 62-121030 | 6/1987 | Japan | 264/177.16 |
| 63-91222 | 4/1988 | Japan | 264/145 |
| 63-93619 | 4/1988 | Japan | 264/167 |
| 2-24094 | 1/1990 | Japan . | |

*Primary Examiner*—Jeffery R. Thurlow
*Attorney, Agent, or Firm*—Cushman, Darby & Cushman

[57] ABSTRACT

A method for forming an extruded weather strip having a trim portion and a lip having a thickened end portion. The method includes the steps of: extruding unvulcanized rubber through a head mounted on a downstream end of an extruder; roughly shaping the extruded unvulcanized rubber by causing the extruded unvulcanized rubber to move through an opening formed in a main die plate disposed downstream of the head so as to shape a portion of the extruded unvulcanized rubber corresponding to the trim portion and a portion of the extruded unvulcanized rubber corresponding to the lip into a shape having a width not smaller than the maximum width of the lip to be finally formed; forming the thickened end portion by causing the shaped unvulcanized rubber to pass through a space defined by a movable orifice plate which is disposed downstream of the main die plate and, while moving the movable orifice plate in the direction of width of the weather strip; and shaping the end of the lip by further advancing the shaped unvulcanized rubber through an end shaping structure, while moving the end shaping structure substantially together with the movable orifice plate.

13 Claims, 12 Drawing Sheets

METHOD OF AND APPARATUS FOR FORMING WEATHER STRIP BY EXTRUSION

BACKGROUND OF THE INVENTION

1. Field of the Invention

The present invention relates to a method of and apparatus for forming, by extrusion, a weather strip for an automobile, particularly, a weather strip having a lip in which the width thereof varies according to the longitudinal position of the weather strip.

2. Description of Related Art

Weather strips have been installed on a phripheral edge of an opening of an automobile body in order to provide a seal between the edge and a mating member, such as a door. A conventional weather strip is shown in FIG. 1. In general, weather strips 21 are formed by well-known extrusion processes in an elongated form and have a cross-sectional shape such as that shown in FIG. 1. More specifically, the weather strip 21 comprises a trim portion 22 having a U-shaped cross-section adapted to be secured to the vehicle body and a lip 23 which extends from the trim portion 22 to the outer side of the vehicle body (rightward in FIG. 1) so as to cover a joint portion of the body thereby improving the appearance of the automobile. The lip 23 has a thickened end portion 23a which faces inwardly of the body (downwardly as viewed in FIG. 1). When the weather strip 21 is installed on the body, the thickened end portion 23a of the lip 23 is in contact with the body.

The configuration of the portion of the body where the weather strip is to be mounted varies according to position. Thus, recently, a demand has arose for a weather strip which enables change in the width W of the lip 23 according to its position with respect to the body. A technique has been proposed, for example in Japanese Unexamined Patent Publication No. 2-24094, to cope with the above-mentioned demand.

This technique employs a roller cutter having upper and lower cutter discs arranged in a pair so as to cut a part of an unvulcanized weather strip immediately after extrusion, thus enabling free change in the width W of the lip 23.

According to this technique, the lip width W is changed simply by severing the end of the weather strip. This means that the thickened end portion 23a of the lip 23 is cut, so that a substantial portion of the thickened end portion 23a is undesirably removed when the width W is to be largely reduced, as illustrated by phantom line in FIG. 2. In such a case, the weather strip has a portion where the width of the thickened end portion 23a is extremely small, with the result that the lip 23 fails to perform the expected function. Furthermore, the cut face of the thickened end portion 23 presents a vertical wall, which impairs overall appearance thereof.

The present invention is provided in order to resolve the above-mentioned problems.

Accordingly, it is a primary object of the present invention to provide a method of, and an apparatus for, forming, through extrusion, a weather strip having a lip which varies in width according to a longitudinal position and which is provided with a thickened end portion, wherein the cross-sectional shape of the thickened end portion is maintained constant regardless of a longitudinal position thereof so as to ensure functioning of the lip while preventing degradation of appearance of the thickened end portion.

SUMMARY OF THE INVENTION

According to one aspect of the present invention, there is provided a method for forming by extrusion, a weather strip of the type which has a trim portion having a substantially U-shaped cross-section and adapted to be secured to a vehicle body and a lip, the width of which varies according to a position along the length of the weather strip, the lip having a thickened end portion, the method includes the steps of: extruding unvulcanized rubber through a head mounted on a downstream end of an extruder; roughly shaping the extruded unvulcanized rubber by causing the extruded unvulcanized rubber to move through an opening formed in a main die plate disposed downstream of a head so as to shape a portion of the extruded unvulcanized rubber corresponding to the trim portion of the weather strip into a shape substantially conforming with the shape of the trim portion to be finally obtained, and a portion of the extruded unvulcanized rubber corresponding to the lip into a shape having a width not smaller than the maximum width of the lip to be finally formed; forming the thickened end portion by causing the shaped unvulcanized rubber to pass through a space defined by a movable orifice plate which is disposed downstream of the main die plate and which is provided with a recess configured substantially in conformity with the shape of the thickened end portion, while moving the movable orifice plate in the width direction of the weather strip, so as to form the portion of the shaped unvulcanized rubber corresponding to the thickened end portion into the shape of the thickened end portion; and shaping the end of the lip by further advancing the shaped unvulcanized rubber through an end shaping means defining a shape corresponding to the shape of the end of the lip to be finally obtained, while moving the end shaping means substantially together with the movable orifice plate, so as to shape the portion of the shaped unvulcanized rubber corresponding to the end of the lip into the shape of the end of the lip to be finally formed.

In one embodiment of the present invention, the step of shaping the end of the lip includes a step of using the shaping means comprising a roller cutter disposed downstream of the movable orifice plate, the roller cutter having a peripheral cutting blade, an edge of which is in contact with or positioned in close proximity to a pedestal plate which extends from the movable orifice plate and which is flush with the upper face of the recess.

In another embodiment of the present invention, the step of shaping the end of the lip includes the step of using upper and lower roller cutters arranged in a pair at the downstream side of the movable orifice plate, the cutter rollers being held in contact with each other at the edges of peripheral cutting blades formed thereon.

In still another embodiment of the present invention, the step of shaping the end of the lip includes a step of using upper and lower forming rollers arranged in a pair in contact with each other downstream of the movable orifice plate, the forming rollers having peripheral surfaces generated by generating lines which define a shape conforming with an arcuate shape of the extremity of the thickened end portion. The step of forming the thickened end portion may include a step of changing the volume of unvulcanized rubber passage means formed in the head. The volume of the passage means is increased when the width of the lip is to be decreased, and decreased when the width of the lip is to be increased to the original width, respectively. The change in the volume of the passage means is conducted such that the volume is minimized at least once in one cycle of the extruding operation.

According to another aspect of the present invention, there is provided an extrusion forming apparatus for forming a weather strip of the type which has a trim portion having a substantially U-shaped cross-section and adapted to be secured to a vehicle body and a lip, the width of which varies according to the position along the length of the weather strip, the lip having a thickened end portion, the apparatus comprising: a head disposed on the downstream end of an extruder and having at least one passage formed therein for passing an unvulcanized rubber therethrough; a main die plate disposed downstream of the head and having an opening including first and second opening portions which respectively correspond to the trim portion and the lip of the weather strip, the second opening portion having a width not smaller than the maximum width of the lip to be formed; a movable orifice plate disposed downstream of the main die plate and having a recess configured substantially in conformity with the shape of the thickened end portion; lip end shaping means disposed downstream of the movable orifice plate for movement in the width direction of the weather strip, the lip end forming means having an inner contour portion corresponding to the shape of the end of the lip; driving means for driving the movable orifice plate and the lip end forming means in the width direction of the weather strip; and control means for controlling the timing of operation of the driving means.

In one embodiment, the lip end shaping means includes a roller cutter disposed downstream of the movable orifice plate, the roller cutter having a peripheral cutting blade the edge of which is in contact with or positioned in close proximity to a pedestal plate which extends from the movable orifice plate and which is flush with the upper face of the recess.

In another embodiment, the lip end shaping means includes upper and lower roller cutters arranged in a pair at the downstream side of the movable orifice plate, the cutter rollers being held in contact with each other at the edges of peripheral cutting blades formed thereon.

In still another embodiment, the lip end shaping means includes upper and lower forming rollers arranged downstream of the movable orifice plate in a pair in contact with each other, the forming rollers having peripheral surfaces generated by generating lines which define a shape conforming with an arcuate shape of the extremity of the thickened end portion. The head has at least one passage formed therein for passing unvulcanized rubber therethrough. The apparatus may further comprise a cylinder-piston device capable of changing internal volume of a cylinder which is connected to the at least one passage formed in the head. The head may have a plurality of passages for the unvulcanized rubber, one of the passages communicating with the second opening portion of the opening corresponding to the lip. The cylinder-piston device capable of changing an internal volume of a cylinder may be connected to a passage communicating with the second opening portion corresponding to the lip.

DESCRIPTION OF THE PREFERRED EMBODIMENTS

A first embodiment of the weather strip extrusion apparatus of the present invention will be described with reference to FIGS. 3 to 8.

Figure 1:
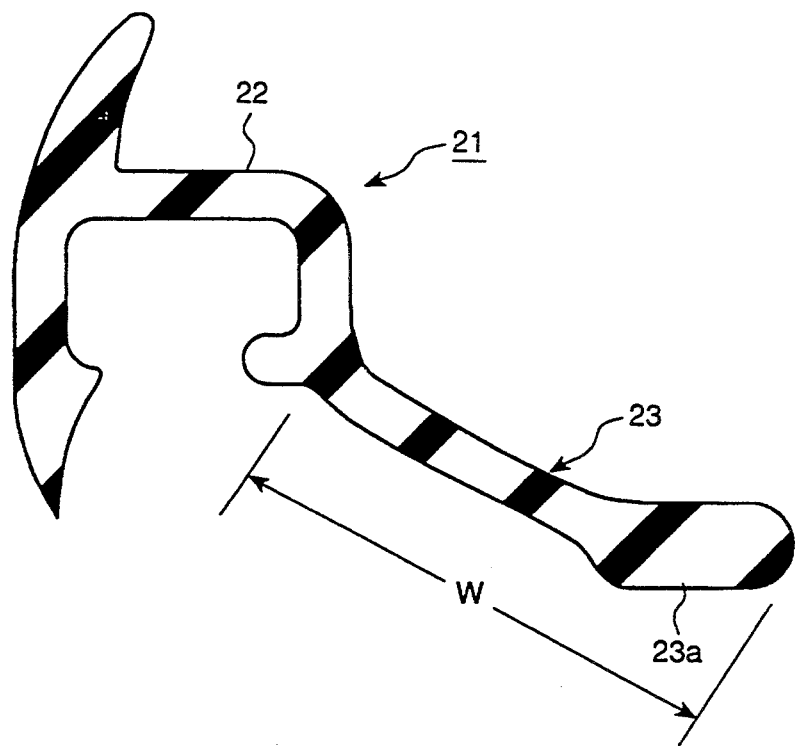
FIG. 1 is a sectional view of a conventional weather strip.
Figure 2:
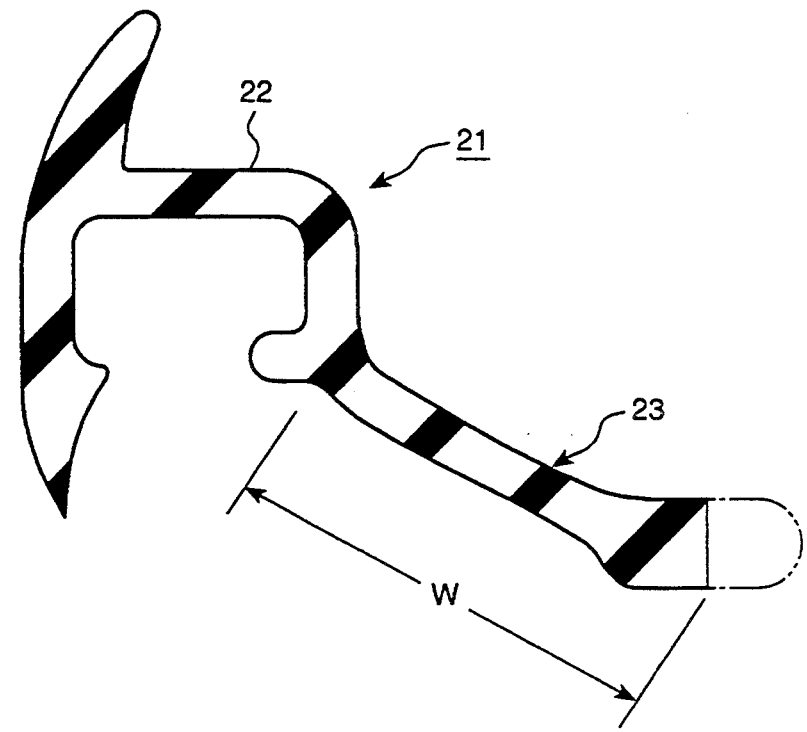
FIG. 2 is a sectional view of the weather strip shown in FIG. 1 partly removed by cutting.
Figure 3:
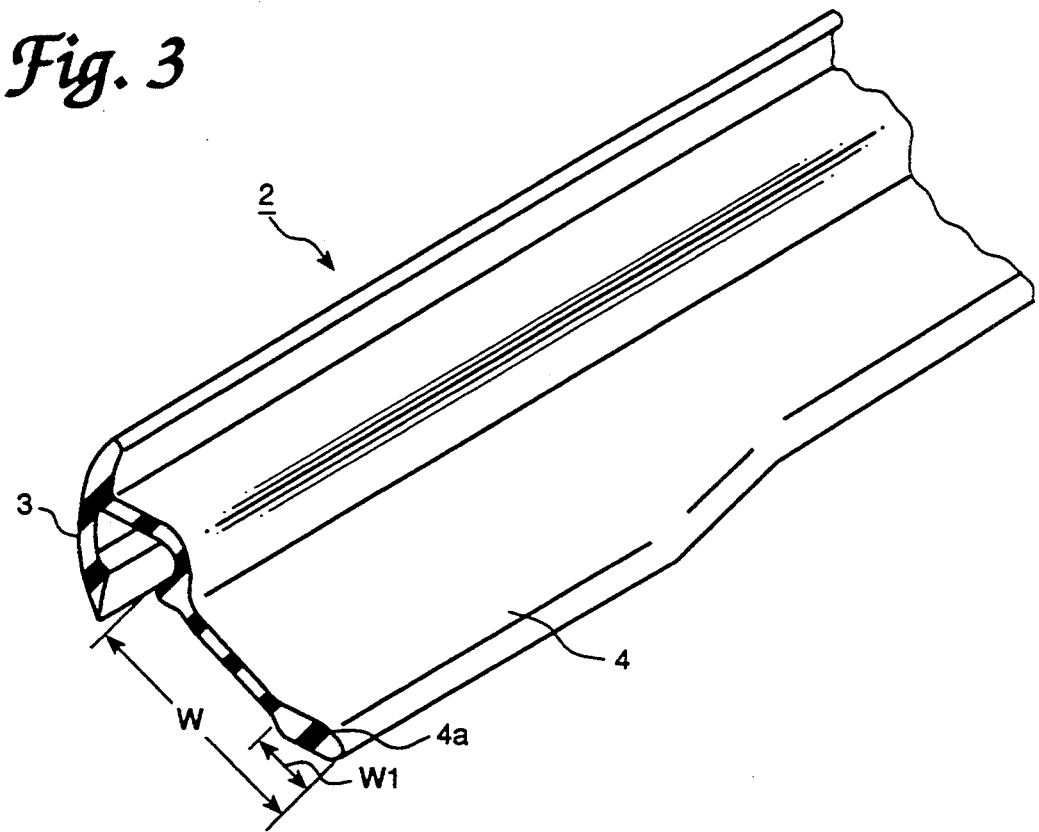
FIG. 3 is a perspective view of a weather strip in accordance with the present invention.

An elongated weather strip 2 is attached to the edge of a door opening of a vehicle body (not shown). The weather strip 2 is formed preferably from EPDM (Ethylene-Propylene-Diene terpolymer rubber) by an extrusion method which will be detailed later, and has a substantially constant cross-sectional shape over its entire length except for a local portion or portions. More specifically, as shown in FIG. 3, the weather strip 2 has a substantially inverse-U-shaped trim portion 3 which is adapted to fit on a flange (not shown) of the vehicle body and a lip 4 which extends from on end edge of the trim portion 3 to the outer side (right side as viewed in FIG. 3) of the vehicle body. The lip 4 has a thickened end portion 4a formed integrally therewith so as to face inwardly (downwardly as viewed in FIG. 3) of the vehicle body. When the weather strip 2 is mounted on the vehicle body, the thickened end portion 4a of the lip 4 comes into contact with the vehicle body so as to cover a joint portion of the body, thereby improving the external appearance of the vehicle.

As shown in FIG. 3, in this embodiment, the width W of the lip 4 of the weather strip 2 varies according to a longitudinal position thereof, in conformity with the variation in the configuration of the strip mounting portion of the vehicle body. It is to be understood, however, that the width w1 of the thickened end portion 4a is maintained constant over the entire length of the weather strip.

A description will now be given of an extrusion apparatus which is employed in the production of the above-described weather strip.

Figure 4:
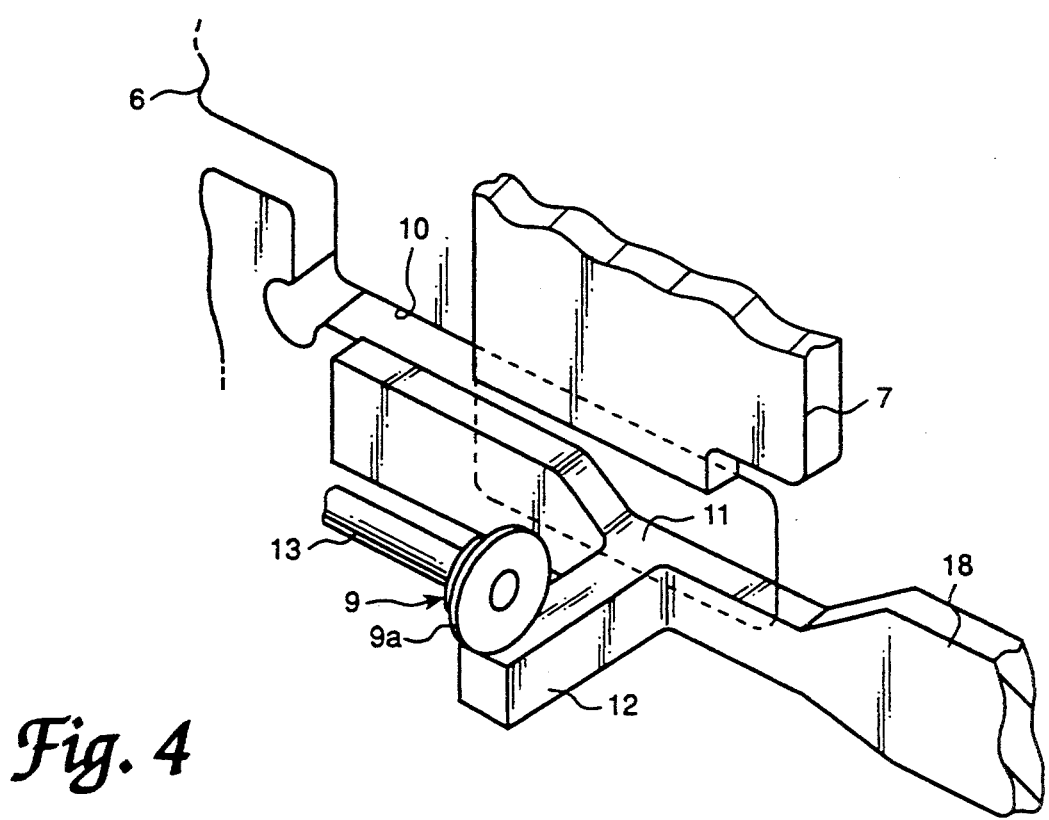
FIG. 4 is a partial perspective view of a first embodiment of a weather strip extrusion apparatus of the present invention, showing particularly components downstream of a main die plate.
Figure 5:
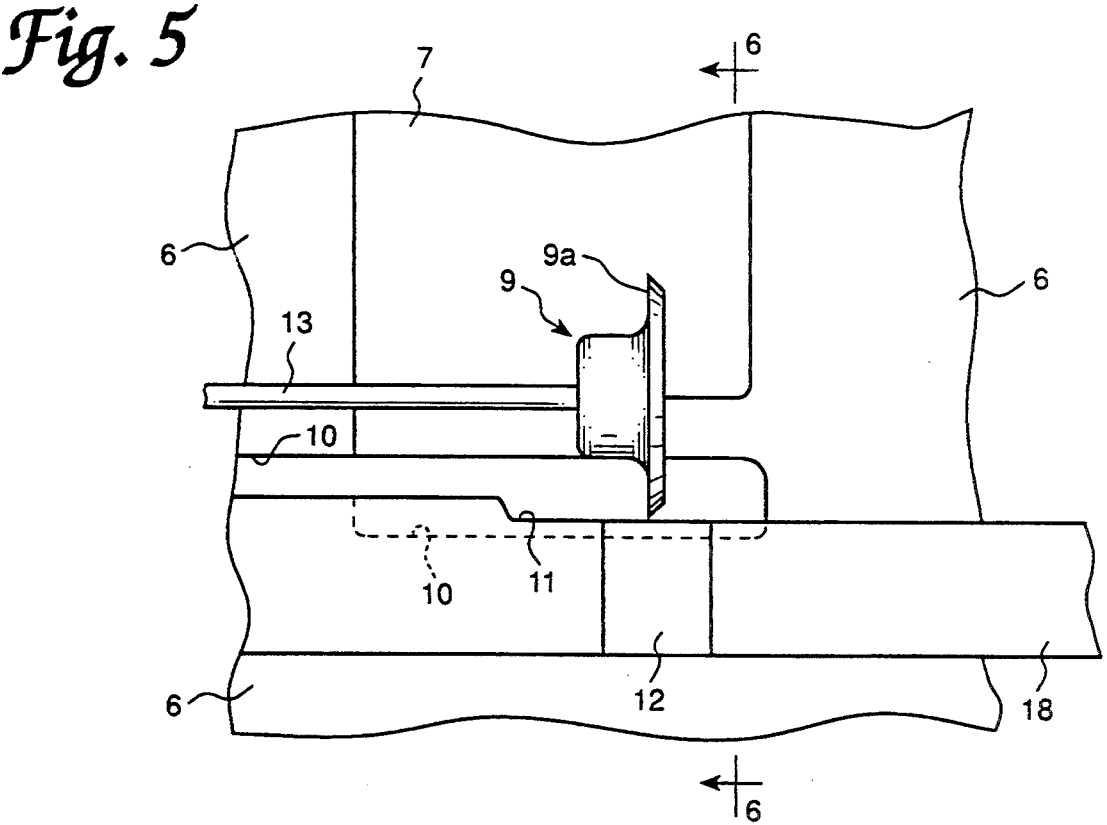
FIG. 5 is a front view of the extrusion apparatus shown in FIG. 4.
Figure 6:
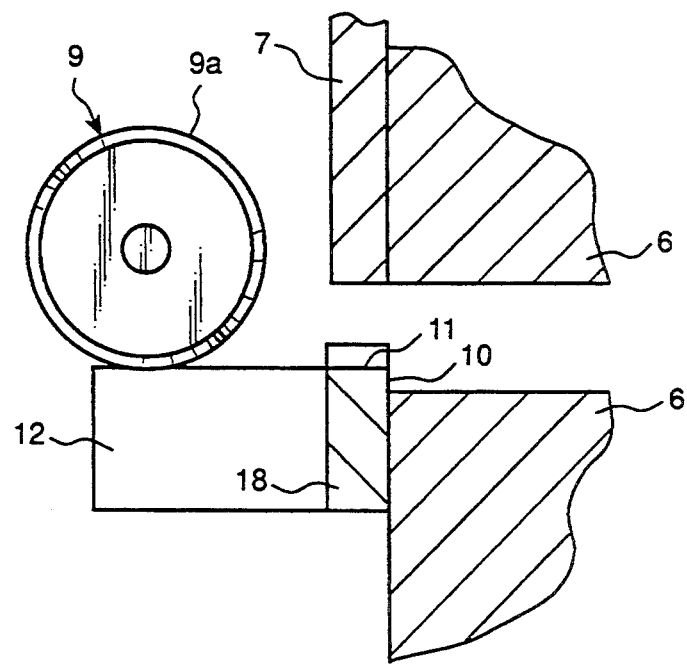
FIG. 6 is a sectional view taken along the line 6—6 of FIG. 5.

Referring to FIGS. 4, 5 and 6, unvulcanized rubber is extruded forwardly (leftwardly as viewed in FIGS. 4 and 6) through a forming device which is mounted on the front end of the extrusion apparatus, so as to be formed into a predetermined shape. The forming apparatus has a head 5 (see FIG. 21) provided on the front end of the extrusion apparatus, a main die plate 6, a fixed orifice plate 7 and a movable orifice plate 18 which are disposed on the front face of the main die plate 6, and a roller cutter 9 which is provided on the movable orifice plate 18. More specifically, the main die plate 6 has an opening 10 which roughly determines the cross-sectional shape of the weather strip 2. A portion of the opening 10 corresponding to the trim portion 3 has the same configuration as the trim portion 3, whereas, another portion of the opening 10 corresponding to the lip 4 is sized to have a width slightly greater than the maximum width of the lip 4.

The fixed orifice plate 7 is fixed in contact with the front face of the main die plate 6 and is disposed generally on the level of the opening 10. More specifically, the lower face of the fixed orifice plate 7 and the upper end surface of the opening 10 are co-planar or flush with each other.

On the other hand, the movable orifice plate 18 is disposed at a level below that of the fixed orifice plate 7, in contact with the front face of the main die plate 6. The movable orifice plate 18 is configured in conformity with the shape of the lower face of the lip portion 4 (surface facing the inner side of the vehicle body) and is provided at an intermediate portion thereof with a recess 11 for forming the aforesaid thickened end portion 4a of the lip 4 of the weather strip. The movable orifice plate 18 also is provided with a pedestal plate 12 which extends perpendicularly to the plate 18, i.e., in the direction of extrusion of the unvulcanized rubber. The upper face of the pedestal plate 12 is flush with the upper face of the recess 11.

In addition, a roller cutter 9 is provided on the upper face of the pedestal plate 12. The roller cutter 9 is rotatably supported by a shaft 13 which is arranged to extend perpendicularly to the direction of extrusion of the unvulcanized rubber. The generating line of peripheral surface of the roller cutter 9 is curved such that the diameter of the roller cutter increases towards the outer side, i.e., rightwardly as viewed in FIGS. 4 and 5, thus presenting an outer configuration similar to that of the thickened end portion 4a of the weather strip. A cutting blade 9a is formed on the outer peripheral edge of the roller cutter 9 integrally therewith. That is to say, the roller cutter 9 is disposed in the close proximity of the pedestal plate 12 of the orifice plate 18 such that the cutting blade 9a is in contact the upper face of the pedestal plate 12 or leaving therebetween a suitable clearance of, for example, 0.05 to 0.2 mm.

The forming device also includes a driving device (not shown) for shifting the movable orifice plate 18 and the roller cutter 9 inclusive of the shaft 13, and a control device (not shown) for controlling the operation of the driving device. By the operations of the control device and the driving device, the movable orifice plate 18 and the roller cutter 9 are moved together in the direction perpendicular to the direction of extrusion of the unvulcanized rubber, i.e., in the direction of the width W of the lip 4 of the weather strip.

A description will now be given of the method of forming the weather strip 2, through an explanation of operation of the extrusion apparatus stated above.

Figure 7:
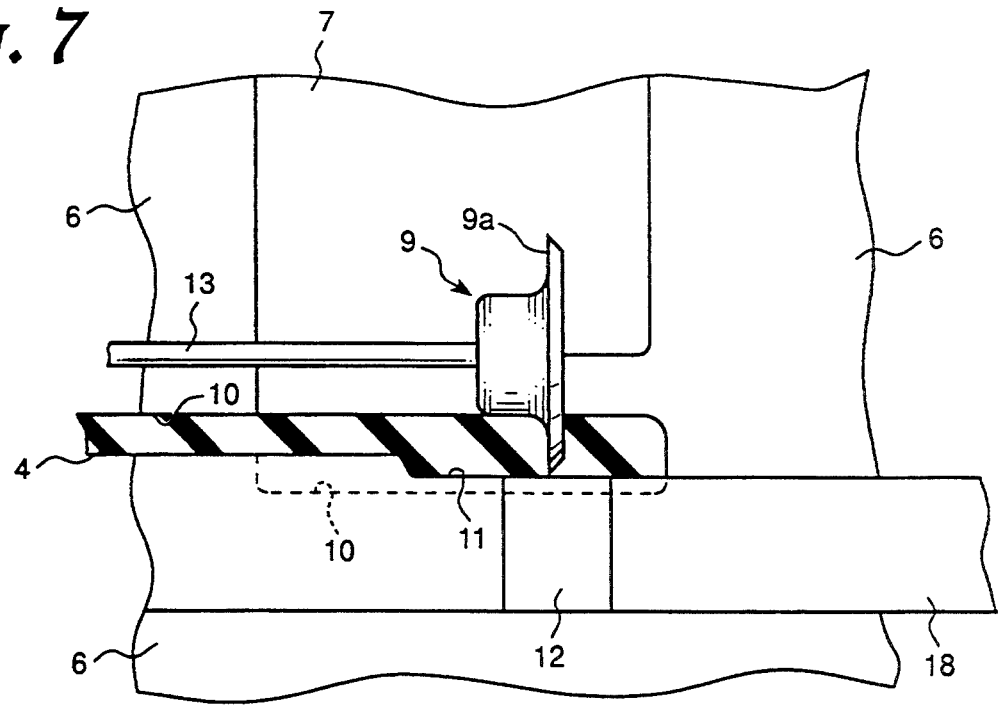
FIG. 7 is a front view of the extrusion apparatus of FIG. 4 illustrative of the extruding operation, wherein an extruded weather strip is shown in section.

As shown in FIG. 7, the movable orifice plate 18 and the roller cutter 9 are stationed at the outermost positions (right end positions as viewed in FIG. 7). In this state, the outermost end of the opening 10 is located at a position which is slightly outward from the roller cutter 9. Unvulcanized rubber is forced to advance from the rear side of the forming apparatus. As a result, the unvulcanized rubber is extruded from the opening 10 of the main die plate 6 so that the cross-sectional shape of the weather strip 2 is roughly determined. Thus, the unvulcanized rubber is shaped such that the trim portion 3 has the same general shape as the final shape while the portion corresponding to the lip 4 has a width slightly greater than the maximum width thereof. The thus extruded unvulcanized rubber is advanced further so that the portion corresponding to the lip 4 is made to pass through the gap between the fixed orifice plate 7 and the movable orifice plate 18. Consequently, the unvulcanized rubber is shaped to have the thickened end portion 4a. The extremity of the lip 4 is shaped by the peripheral surface of the roller cutter 9 on the pedestal plate 12. The peripheral surface of the roller cutter also determines the width W of the lip, as the cutting blade of the roller cutter cuts off unnecessary portion of the extruded unvulcanized rubber.

Figure 8:
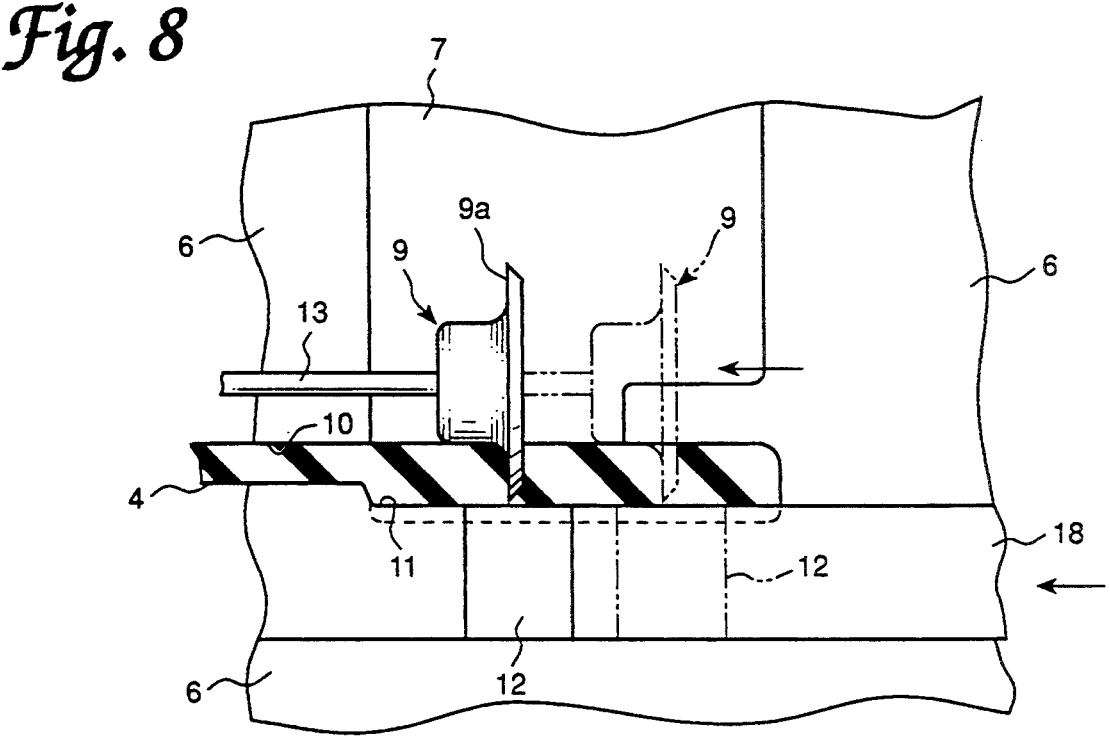
FIG. 8 is a front view of the extrusion apparatus of FIG. 4 illustrative of the extruding operation in a state in which a movable orifice plate and a roller cutter have been moved towards a trim portion of the weather strip, wherein only the weather strip which is being extruded is shown in section.

During the continuous extruding operation,,when it is determined by the aforesaid control device that the time has come for reducing the width W of the lip 4, the control device operates the driving device so that, as shown in FIG. 8, the movable orifice plate 18 and the roller cutter 9 are moved together inwardly of the body (leftwardly as viewed in FIG. 8). Consequently, the position at which the cutting by the roller cutter 9 is effected it shifted inwardly while the shape of the thickened end portion 4a of the lip 4 remains unchanged.

Since the movable orifice plate 18 and the roller cutter 9 move linearly or continuously, the width W of the lip 4 is reduced smoothly without any step or discontinuity along the length of the weather strip, while the shape and the size of the thickened end portion 4a remain unchanged, as shown in FIG. 3.

A control and operation reverse to those described above are conducted when the control device has determined that the time has come to resume the original width W, i.e., to increase the width, of the lip 4. Namely, the movable orifice plate 18 and the roller cutter 9 are moved together outwardly, i.e., to the right as viewed in FIG. 8, whereby the lip 4 is formed to increase its width W along the length thereof smoothly. Thus, the position at which the cutting is conducted by the roller cutter 9 is shifted inwardly or outwardly as the movable orifice plate 18 an the roller cutter 9 are moved inwardly or outwardly together, thus achieving a desired change in the width W of the portion corresponding to the lip 4, whereby the unvulcanized rubber is formed into the weather strip 2 having the desired shape.

In the weather strip 2 thus formed, the width W varies according to a position along a length thereof, but the length and shape or appearance of the thickened end portion 4a of the strip are not changed along the length of the strip both at the straight portion of the strip where the width W is kept constant and transient portions where the width W varies progressively.

As will be understood from the foregoing description, the fist embodiment of the present invention eliminates the aforementioned problem of the known art, i.e., impairment of the function of the lip 4 due to variation in the thickened end portion 4a, in particular a reduction in the width w1 of the end portion 4a, thus ensuring safe functioning of the lip 4.

Figure 9:
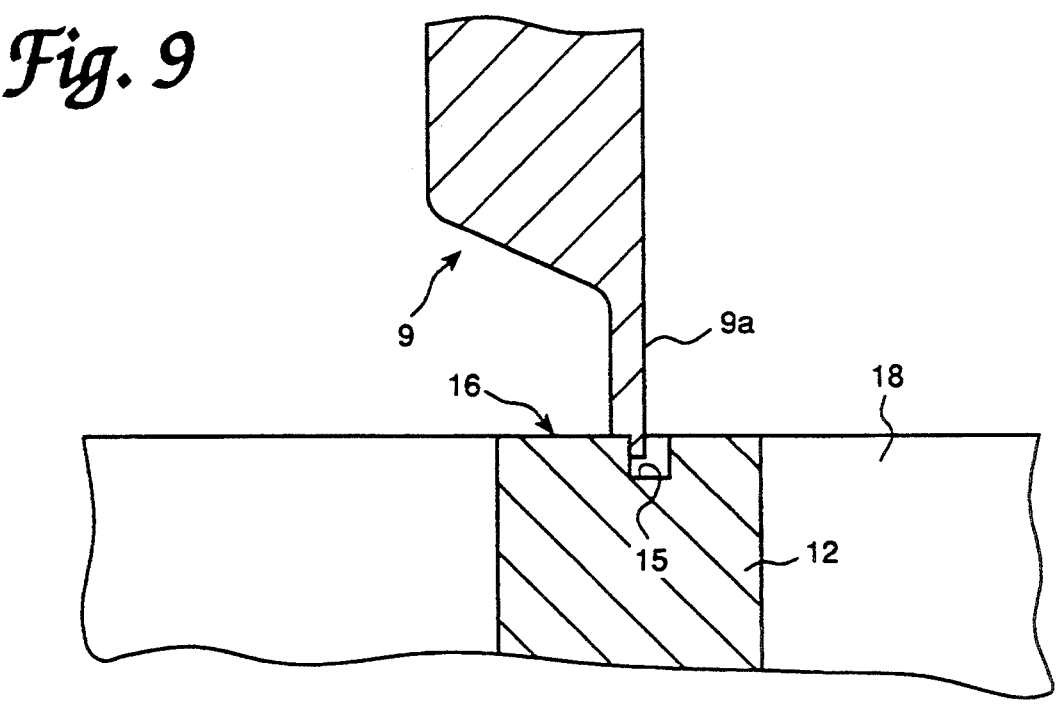
FIG. 9 is a front sectional view of modifications of the orifice plate and the roller cutter used in the first embodiment.
Figure 10:
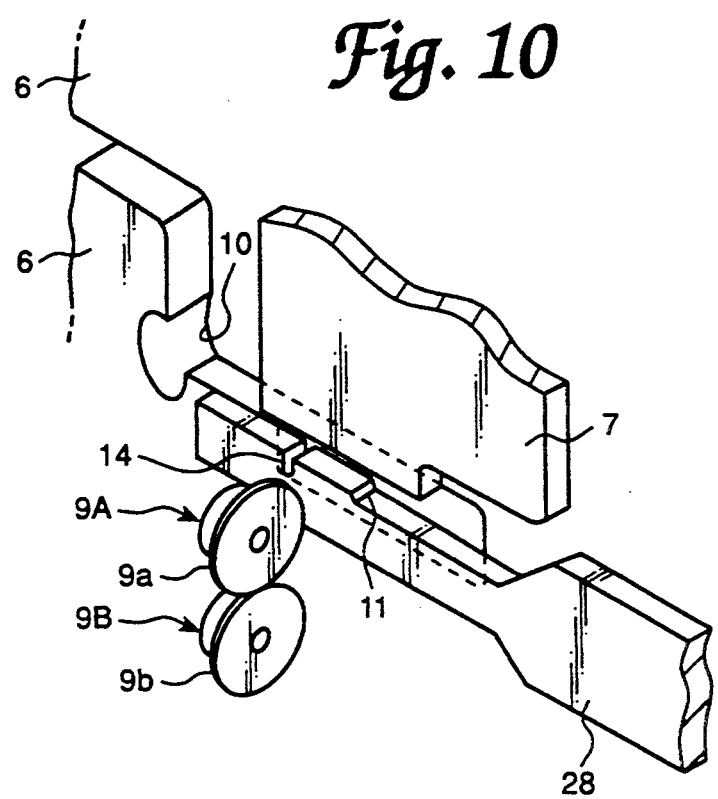
FIG. 10 is a perspective view of a second embodiment of a weather strip extrusion apparatus of the present invention, showing components downstream of a main die plate.

In the embodiment shown in FIGS. 3 to 8, the blade 9a of the roller cutter 9 comes into direct contact with the upper face of the pedestal plate 12. This, however, is not exclusive and may be modified such that the blade 9a is received in a groove 15 formed in a rail base 16 provided on the pedestal plate 12, as shown in FIG. 9. Such a modification facilitates the cutting operation, thus ensuring that the unvulcanized rubber is cut correctly.

The first embodiment described above is advantageously used particularly when one of the outer edges of the thickened end portion 4a has an acute angle.

A description will now be given of a second embodiment of the extrusion apparatus of the present invention which is suitably used in cases where both outer edges of the thickened end portion 4a are rounded, with specific reference to FIGS. 10 to 15. The description will be focused mainly to the features of the second embodiment which are different from those of the first embodiment.

The extrusion apparatus has, similarly to the apparatus of the first embodiment, a head 5 fixed to the front end of the extrusion apparatus, a main die plate 6 and a fixed orifice plate 7. A movable orifice plate 28, which is disposed in contact with the front face of the main die plate 6, is provided with a groove 14 for forming a rib on the lip of the weather strip, in addition to the recess 11 similar to that in the first embodiment.

Upper and lower roller cutters 9A and 9B arranged in a pair are disposed at the front side of the fixed orifice plate 7 and the movable orifice plate 28 in close proximity thereof. Each of the roller cutters 9A and 9B are carried for rotation by a shaft which extends in the direction perpendicular to the direction of extrusion of the unvulcanized rubber. The generating line of the peripheral surface of each of the roller cutters 9A and 9B is so curved as to increase the diameter of the roller cutter towards the outer side (rightward as viewed in FIG. 11), in conformity with the curved outer configuration of the thickened end portion 4a of the weather strip. The roller cutters 9A, 9B have outer peripheral cutting blades 9a, 9b formed integrally therewith. Thus, the roller cutters 9A and 9B come into contact with each other at the edges of their cutting blades 9a, 9b, so that the generating lines of the outer peripheral surfaces of both roller cutters 9A, 9B form therebetween a contour which conforms with the cross-sectional shape of the end of the lip 4 to be obtained.

This embodiment also includes a driving device for shifting the movable orifice plate 28 and the roller cutters 9A, 9B inclusive of the shafts, and a control device (not shown) for controlling the operation of the driving device. In this embodiment, the movable orifice plate 28 and the roller cutters 9A, 9B are adapted to be moved in directions perpendicular to the direction of extrusion of the unvulcanized rubber, i.e., in the direction of the width W of the lip 4, by the operation of the driving device under the control of the control device. It is to be noted that the movable orifice plate 28 can move selectively together with the roller cutters 9A, 9B or relative to these cutters.

Figure 11:
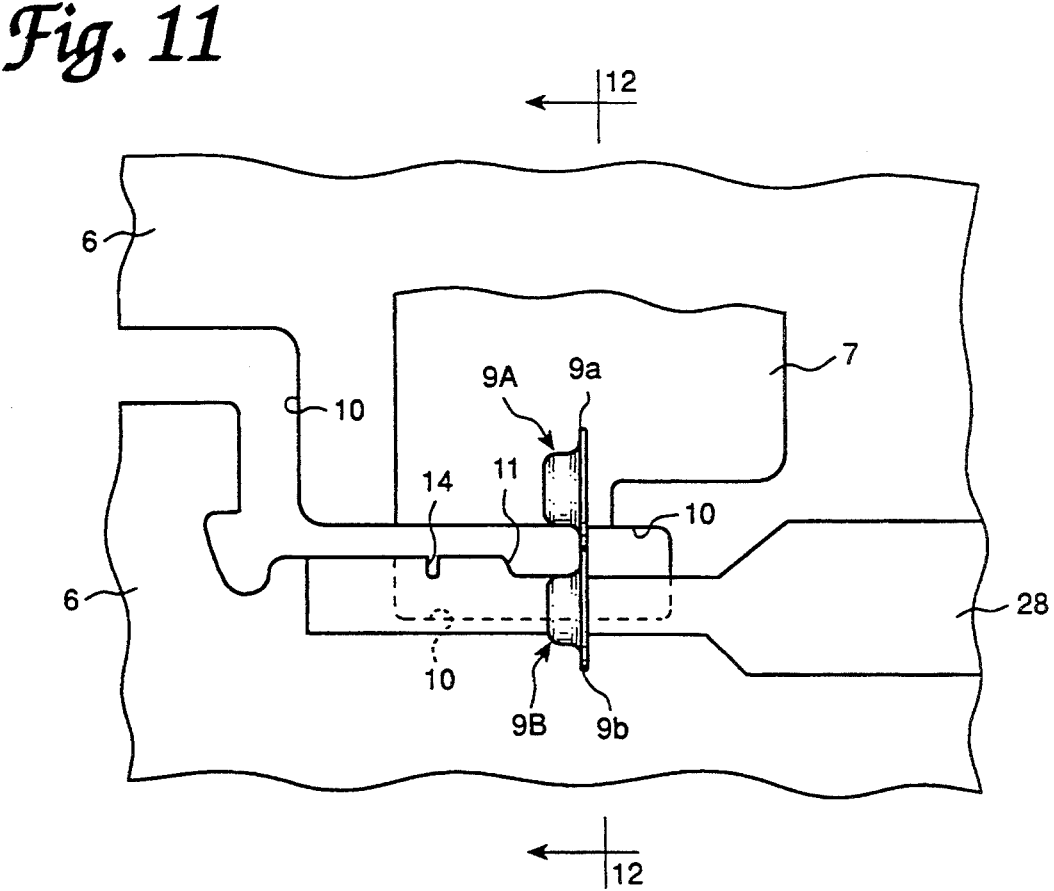
FIG. 11 is a front view of the extrusion apparatus shown in FIG. 10.
Figure 12:
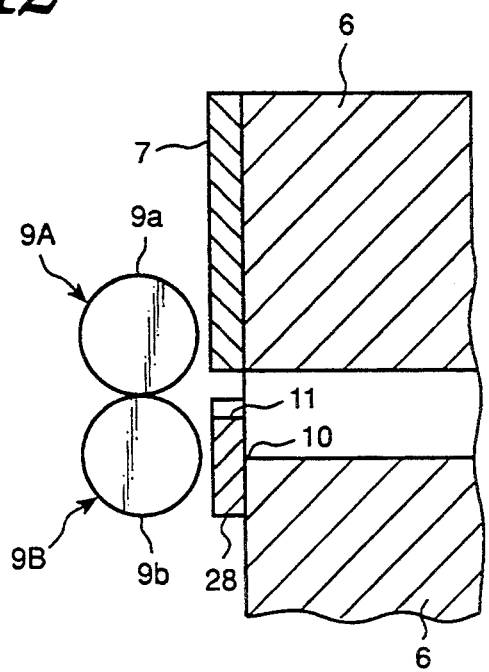
FIG. 12 is a sectional view taken along the line 12—12 of FIG. 11.
Figure 13:
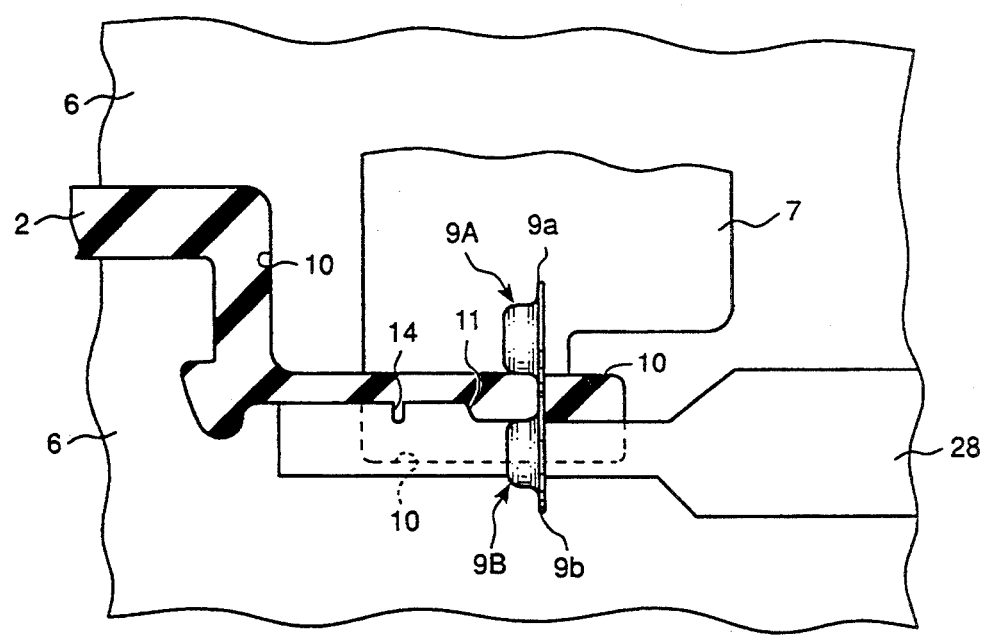
FIG. 13 is a front view of the extrusion apparatus of FIG. 10 illustrative of the extruding operation, wherein an extruded weather strip is shown in section.

In operation, as shown in FIG. 11, the movable orifice plate 28 and the roller cutters 9A, 9B are first stationed at outer end positions (right end as viewed in FIG. 11). Unvulcanized rubber is forced forwardly from the rear side of the forming apparatus, so that the unvulcanized rubber is extruded through the opening 10 in the main die plate 6 as shown in FIG. 13. The cross-sectional shape of the weather strip 2 is roughly determined by this extrusion. More specifically, the unvulcanized rubber is shaped to have a portion corresponding to the trim portion 3 having the same shape as the final shape of the trim portion 3 and a portion corresponding to the lip 4 having a width slightly greater than the maximum width of the lip 4 to be obtained.

As the unvulcanized rubber is further advanced, the portion of the rubber corresponding to the lip 4 is made to pass through a gap between the fixed orifice plate 7 and the movable orifice plate 28 which are positioned in front of the opening 10, whereby the above-mentioned portion of the unvulcanized rubber is shaped to have the thickened end portion 4a and the rib. Meanwhile, the end portion of the lip 4 is configured by the peripheral surfaces of the pair of rollers 9A, 9B. In particular, the edge which is visible when the weather strip is mounted on a vehicle body is suitably curved. At the same time, the unnecessary portion of the unvulcanized rubber is removed by being cut away by the roller cutter pair 9A, 9B, whereby the width of the lip 4 is determined.

Figure 14:
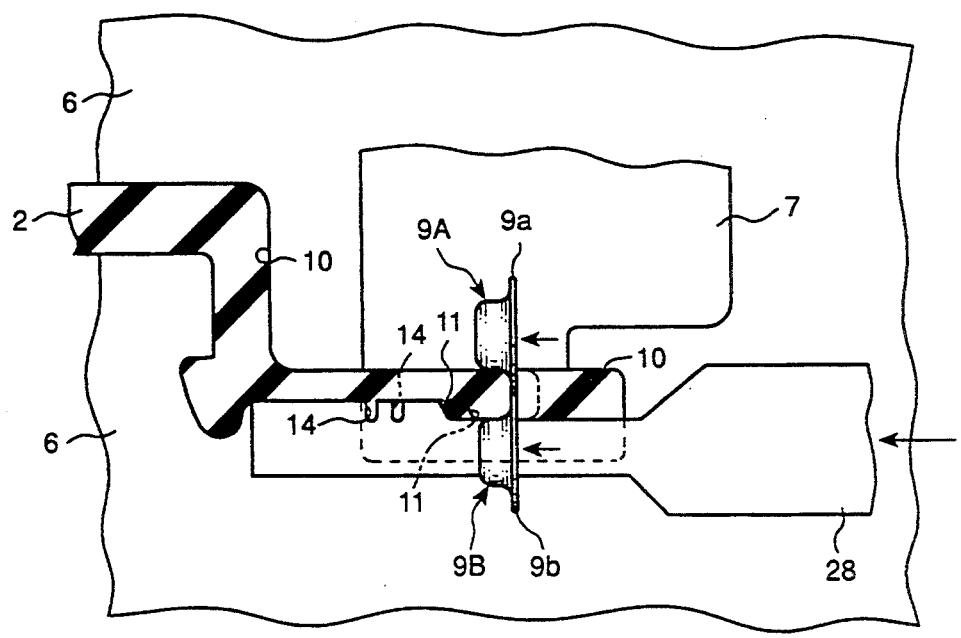
FIG. 14 is a front view of the extrusion apparatus of FIG. 10 illustrative of the extruding operation in a state in which a movable orifice plate and a roller cutter have been moved towards a trim portion of the weather strip, wherein only the weather strip which is being extruded is shown in section.
Figure 15:
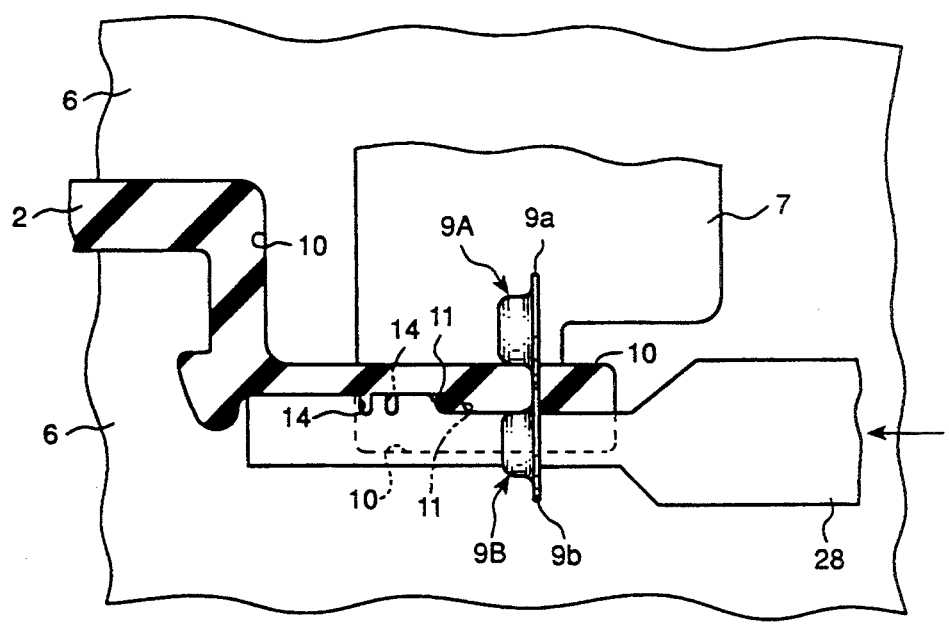
FIG. 15 is a front view of the extrusion apparatus of FIG. 10 illustrative of the extruding operation in a state in which the movable orifice plate alone has been moved towards a trim portion of the weather strip, wherein only the weather strip which is being extruded is shown in section.

During the extrusion, the control device, upon deciding that the time has come for reducing the width W of the lip 4, operates the driving device so that, as shown in FIG. 14, the movable orifice plate 28 and the roller cutters 9A, 9B are shifted together inward (leftward as viewed in FIG. 14). Consequently, the position at which the cutting is effected by the roller cutters 9A, 9B is shifted inwardly, while the shapes of the thickened end portion 4a and the rib, as well as mutual relative positions thereof, remain unchanged. Since the movement or shifting of the movable orifice plate 28 and the roller cutters 9A, 9B is effected linearly or continuously, the reduction of the width of the lip 4 takes place smoothly without discontinuity or step along the length of the weather strip.

The control device, when it has determined that the time has come for restoring the original width W, i.e., to increase the width W; operates to cause an operation reverse to the width-reducing operation described above. Namely, the control device operates the driving device so as to move the movable orifice plate 28 and the roller cutters 9A, 9B outwardly (to the right as viewed in FIG. 14), whereby the width W of the lib 4 is smoothly and continuously increased along the length of the weather strip. Thus, when the movable orifice plate 28 and the roller cutters 9A, 9B are moved inwardly or outwardly together, the cutting position is correspondingly shifted inwardly or outwardly to vary the width W of the lip 4. The unvulcanized rubber is thus formed into the final shape of the weather strip.

When it is desired to shift the position of the rib inwardly without changing the width W of the lip 4, the movable orifice plate 28 alone is shifted inwardly (leftwardly as viewed in FIG. 15) while the roller cutters 9A, 9B remain stationary. Since the roller cutters 9A and 9B are stationary, the cutting position and, hence, the width W of the lip 4 remains unchanged. However, since the movable orifice plate 28 is moved inwardly, the position of the groove 14 and, hence, the position of the rib are shifted inwardly, causing a change in the distance between the end of the weather strip and the rib. Meanwhile, since the recess 11 also is shifted, the length of the thickened end portion 4a is increased.

Conversely, when it is desired to reduce the length of the thickened end portion 4a without changing the position of the rib, i.e., the distance between the base end of the lip 4 and the rib, the pair of roller cutters 9A, 9B alone are shifted inwardly (leftwardly in FIG. 15) while the movable orifice plate 28 remains stationary. Since the position of the movable orifice plate 28 is not changed, the position of the rib also remains unchanged. Meanwhile, since the roller cutters 9A, 9B are shifted inwardly, the unvulcanized rubber is cut at its portion corresponding to extremity of the lip 4, whereby the width of the lip 4 is reduced with the length of the thickened end portion 4a shortened. The position of the rib is not changed, although the distance between the rib and the extremity of the lip 4 is reduced.

By suitably combining the above-described two types of operation, it is possible to obtain various forms of the lip 4 in terms of the width W, length of the thickened end portion 4a and the position of the rib. It is thus possible to form the unvulcanized rubber into the weather strip 2 of the desired configuration.

As has been described in detail, according to the second embodiment of the present invention, it is possible to vary the width W of the lip 4 without changing the shape of the thickened end portion 4a and without changing the distance between the extremity of the thickened end portion 4a and the rib, by shifting the movable orifice plate 28 and the roller cutters 9A, 9B together as a unit. It is also possible to vary the distance between the extremity of the lip 4 and the rib and the length of the thickened end portion 4a, by causing a relative movement between the roller cutters 9A, 9B and the movable orifice plate 28. It is therefore possible to suitably vary the position of the functional parts such as the thickened end portion 4a and the rib, thus enhancing the degree of freedom of the design of the lip 4 to make it adaptable to various objects or conditions of use, thereby ensuring sufficient functioning of the lip.

A description will now be given of a third embodiment of the extrusion apparatus of the present invention with specific reference to FIGS. 16 to 24. The description will be concentrated mainly on the features which distinguish the third embodiment from the first and second embodiments. Thus, like parts are given like numerals.

Figure 21:
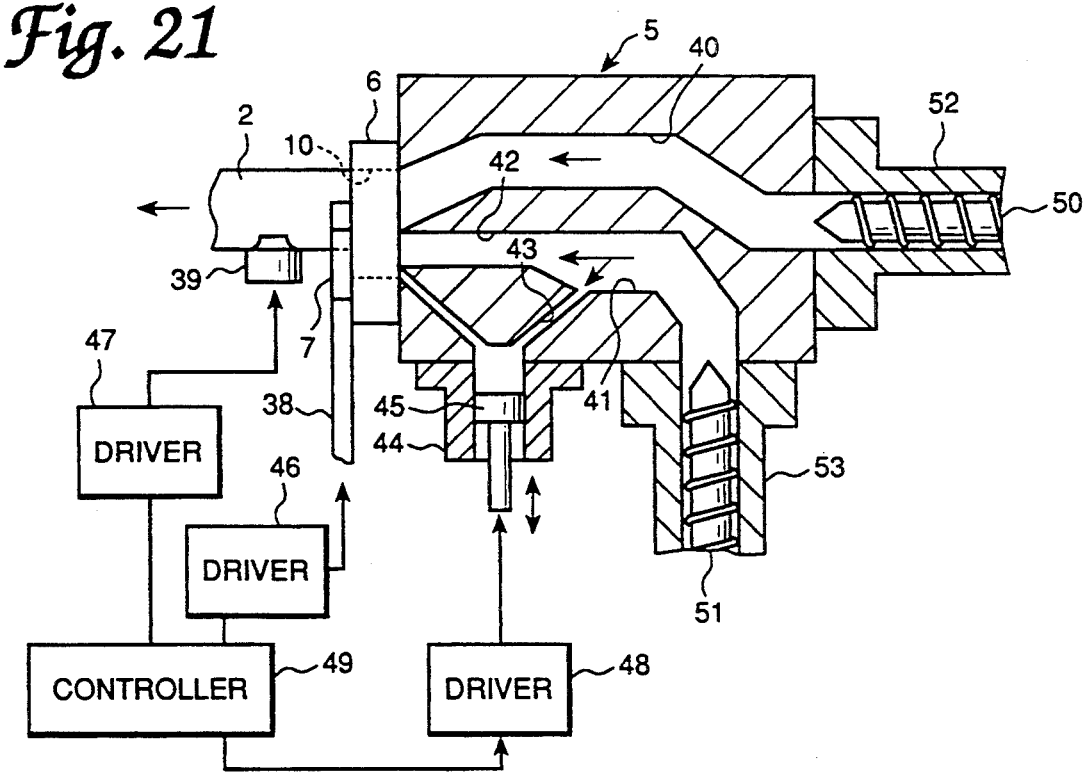
FIG. 21 is a schematic sectional plan view of the extrusion apparatus shown in FIG. 16.
Figure 22:
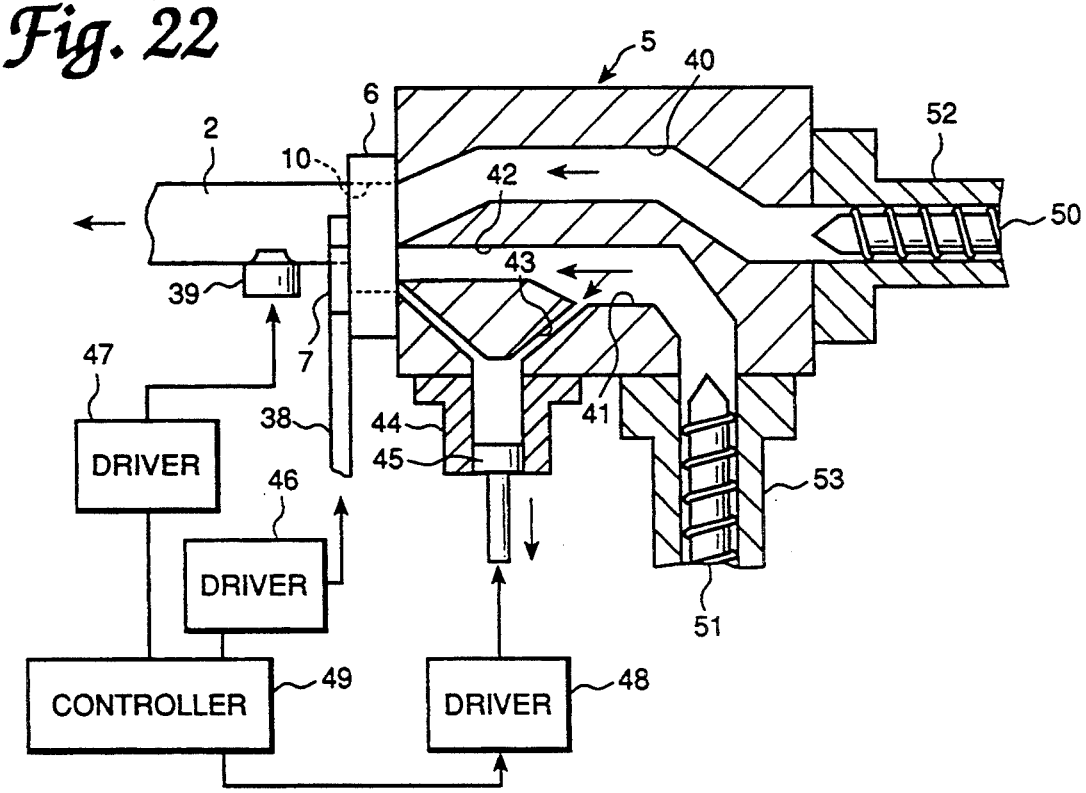
FIG. 22 is a schematic sectional plan view of the extrusion apparatus shown in FIG. 16 in a state in which a volume adjusting mechanism in a head has been set to provide maximum volume.

Referring to FIG. 21, unvulcanized rubber is extruded forwardly (leftwardly as viewed in FIG. 21) through an extrusion apparatus to have a predetermined configuration. More specifically, the extrusion apparatus has a head 5 for forwardly extruding the unvulcanized rubber, a main die plate 6 disposed on the front side of the head 5, a fixed orifice plate 7 and a movable orifice plate 38 disposed in contact with the front face of the main die plate 6, and forming rollers 39 disposed in front of the orifice plates. More specifically, the main die plate 6 has an opening which is configured to roughly determine the cross-sectional shape of the weather strip 2. The portion of the opening 10 corresponding to the trim portion 3 of the weather strip has a shape which conforms with the shape of the trim portion 3 of the weather strip 2 as the final product. The portion of the opening 10 corresponding to the lip 4 has a width substantially equal to the maximum width of the lip 4 of the weather strip 2 as the final product.

The fixed orifice plate 7 is fixed in contact with the front face of the main die plate 6 and is disposed at a level above that of the portion of the opening 10 for forming the lip 4. More specifically, the lower face of the fixed orifice plate 7 is flush with the upper end surface of the portion of the opening 10 for forming the lip 4.

The movable orifice plate 38 is disposed in contact with the front face of the main die plate 6, below the fixed orifice plate 7. The movable orifice plate 38 is configured in conformity with the configuration of the lower face of the lip 4, i.e., the surface of the lip 4 facing inwardly of the vehicle body. A recess 11 for forming a thickened end portion 4a is formed at an intermediate portion of the movable orifice plate 38. The movable orifice plate 38 is held in contact with the lower face of the fixed orifice plate 7 so as to be slidable in the direction of width of the lip 4, i.e., leftwardly and rightwardly directions as viewed in FIG. 17.

Figure 16:
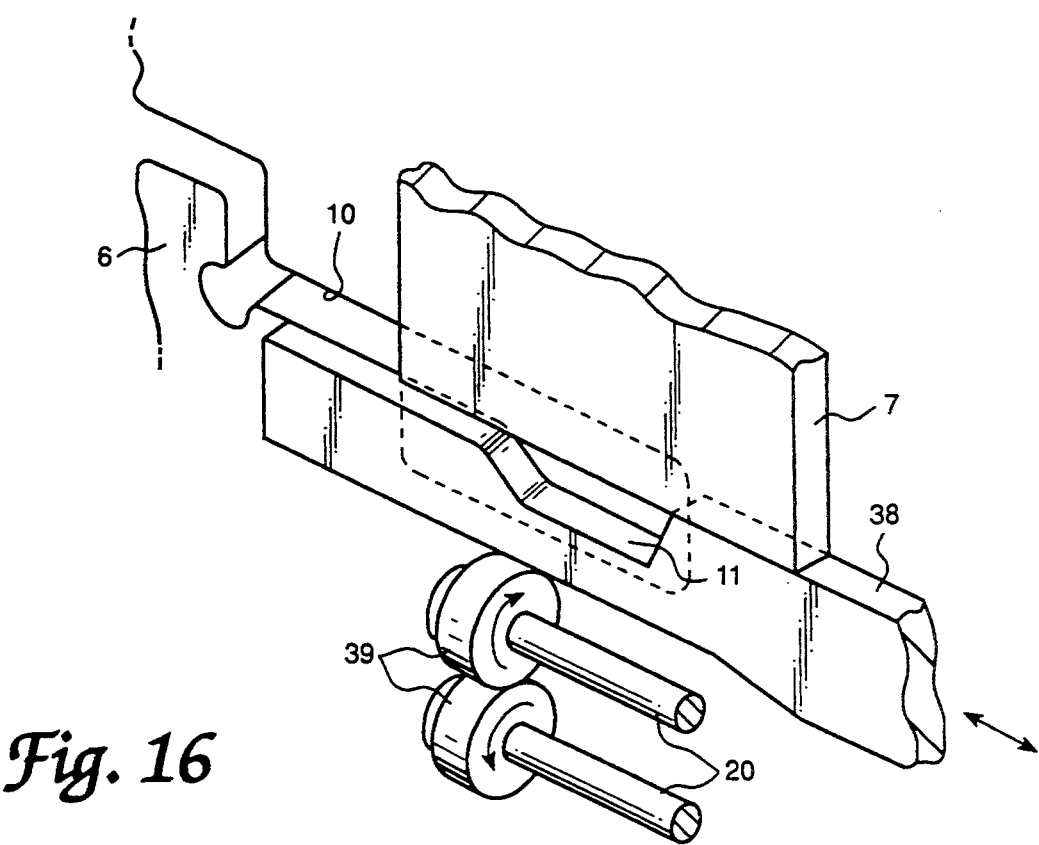
FIG. 16 is a perspective view of a third embodiment of a weather strip extrusion apparatus of the present invention, showing particularly components downstream of a main die plate.
Figure 17:
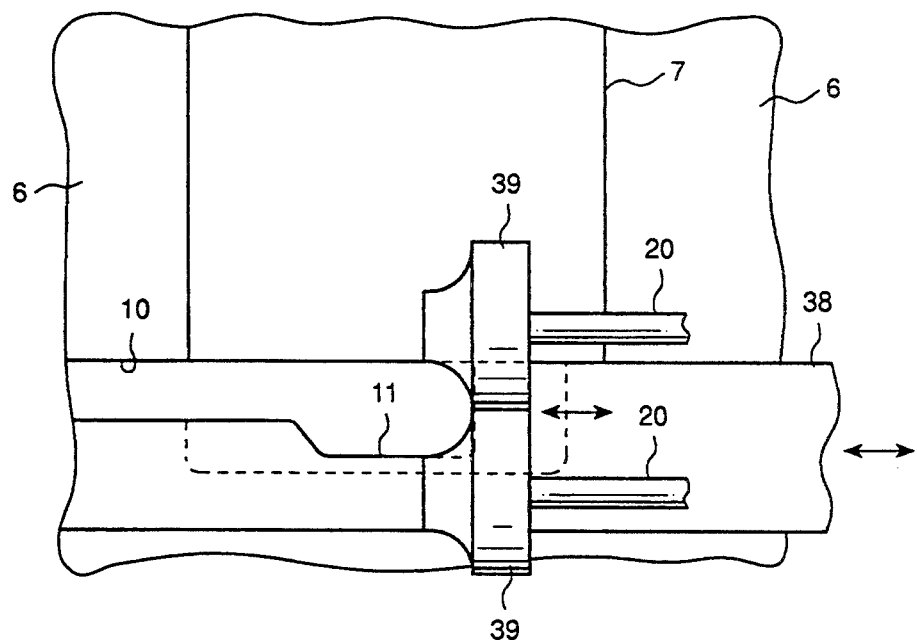
FIG. 17 is a front view of the extrusion apparatus shown in FIG. 16.

Upper and lower forming rollers 39, arranged in a pair, are disposed in front of the fixed orifice plate 7 and the movable orifice plate 38. As shown in FIG. 16, each forming roller is rotatably carried by a shaft 20 which extends in a direction perpendicular to the direction of extrusion of the unvulcanized rubber. Both forming rollers are held in contact with each other. Left half part (as viewed in FIG. 18) of each forming roller has a peripheral surface generated by a generating line which is curved so that the diameter of the left half part of the roller increases towards the outer side, i.e., rightwardly as viewed in FIG. 17. Thus, the left half parts of both forming rollers 39 in cooperation form a path exhibiting a cross-section which conforms with the cross-sectional shape of the arcuate extremity of the thickened end portion 4a.

The head 5 of the forming apparatus in this embodiment has a mechanism for varying the extrusion rate so as to ensure that the unvulcanized rubber is extruded at the required rate which varies in accordance with the movement of the movable orifice plate 38. The construction of this mechanism will be described in detail with reference to FIG. 21. Extruders 52, 53 having screws 50, 51 for forwardly extruding the unvulcanized rubber are disposed on the rear side (right side as viewed in FIG. 21) of the head 5. First and second flow passages 40 and 41 are formed in the head 5 so as to guide the flow of the unvulcanized rubber extruded from the extruders 52, 53, respectively. Both flow passages 40 and 41 merge into each other at their downstream ends (left ends as viewed in FIG. 21). The unvulcanized rubber introduced through the first flow passage 40 mainly forms the trim portion 3, while the unvulcanized rubber introduced through the second flow passage 41 mainly forms the lip portion 4, of the weather strip 2. The second flow passage 41 branches at its intermediate portion into third and fourth flow passages 42 and 43.

A cylinder 44 is formed to open to an intermediate portion of the fourth flow passage 43. The cylinder 44 receives a piston 45. Thus, part of the unvulcanized rubber flowing through the fourth passage 43 fills the cylinder 44. The volume of the unvulcanized rubber to be received in the cylinder 44 is varied by a movement of the piston 45 in the cylinder 44.

As shown in FIG. 21, drivers 46, 47 and 48 are provided for driving the orifice plate 38, the forming rollers 39 (inclusive of the shafts 20) and the piston 45. These drivers 46 to 48 comprise, for example, servomotors and are controlled by a controller 49 such that the amounts of movements of the movable orifice plate 38, forming rollers 39 and the piston 45 are adjusted by the controller 49. In this embodiment, however, the movable orifice plate 38 and the forming rollers 39 move substantially together with each other.

A description will now be given of the operation of the extrusion apparatus having the above described construction.

The extruders 52, 53 are actuated to forwardly extrude the unvulcanized rubber so that the unvulcanized rubber extruded therefrom is made to flow through the first and second flow passages 40 and 41. The unvulcanized rubber flowing through the first flow passage 40 is directly introduced into the opening 10 in the main die plate 6. Meanwhile, the unvulcanized rubber flowing through the second flow passage 41 shunts into the third and fourth flow passages 42 and 43. The unvulcanized rubber flowing through the third flow passage 42 is directly introduced to the opening in the main die plate 6. The unvulcanized rubber flowing in the fourth flow passage 43 is introduced to the opening in the main die plate 6 past the region Where the cylinder 44 opens.

Figure 18:
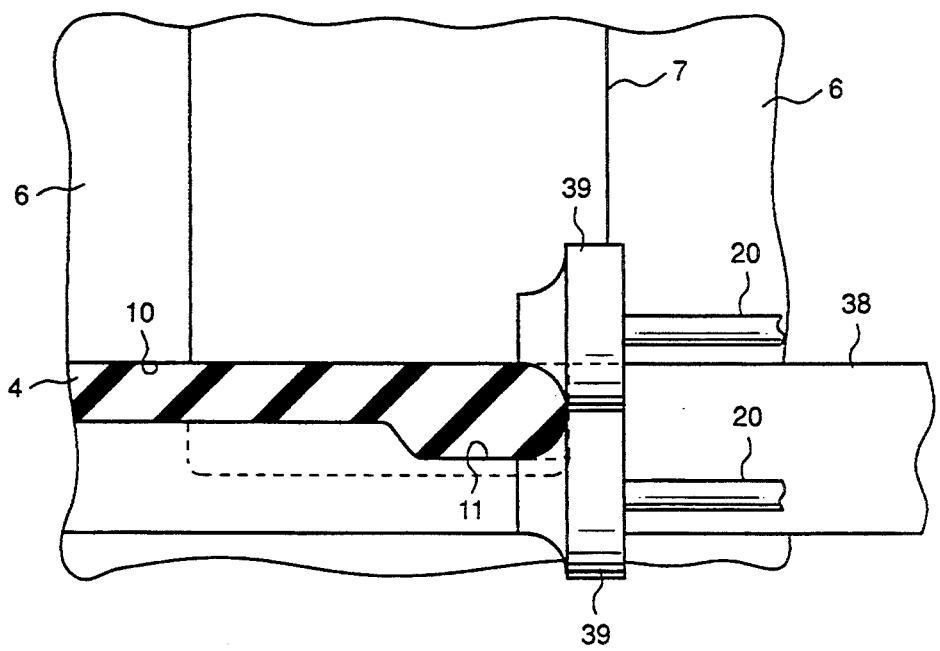
FIG. 18 is a front view of the extrusion apparatus of FIG. 16 illustrative of the extruding operation, wherein an extruded weather strip alone is shown in section.

As shown in FIG. 18, the movable orifice plate 38 and the forming rollers 39 are stationed at the outermost positions (right end positioned as viewed in FIG. 18) in the beginning of the operation. The unvulcanized rubber flowing through the flow passages 40, 42 and 43 is extruded through the opening 10 of the main die plate 6 so as to have a cross-section which substantially conforms with the cross-sectional shape of the weather strip as the final product. More specifically, the portion which corresponds to the trim portion 3 is exactly shaped in conformity with the final shape of the trim portion while the portion corresponding to the lip 4 is shaped roughly in conformity with the final shape of the lip 4.

Figure 20:
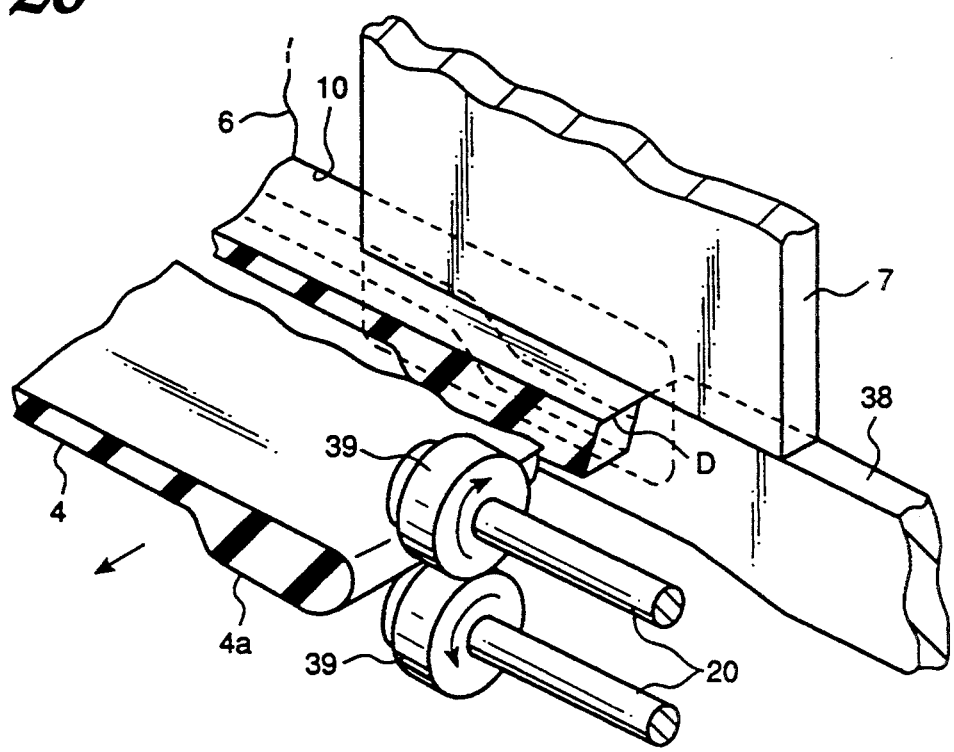
FIG. 20 is a perspective view of the extrusion apparatus of FIG. 16, illustrative of the extruding operation in a state in which the movable orifice plate and the forming rollers have been moved towards the trim portion.

The unvulcanized rubber is then made to pass through the space between the fixed orifice plate 7 and the movable orifice plate 38 which are disposed in front of the opening 10. As a result, a thickened end portion 4a is roughly formed as illustrated in FIG. 20 and the width W of the lip is determined. The extrusion through the space between both orifice plates 7, 38 involves a risk that the unvulcanized rubber undesirably flows into gap formed on both orifice plates 7, 38, resulting in temporary formation of a burr D on the visible end edge of the thickened end portion 4a. In the illustrated embodiment, however, the extremity is smoothly shaped by the peripheral surfaces of the pair of forming rollers 9 so as to exhibit a smooth curve, thus removing any burr D. Consequently, no burr D is left at least on the visible end of the weather strip 2.

Figure 19:
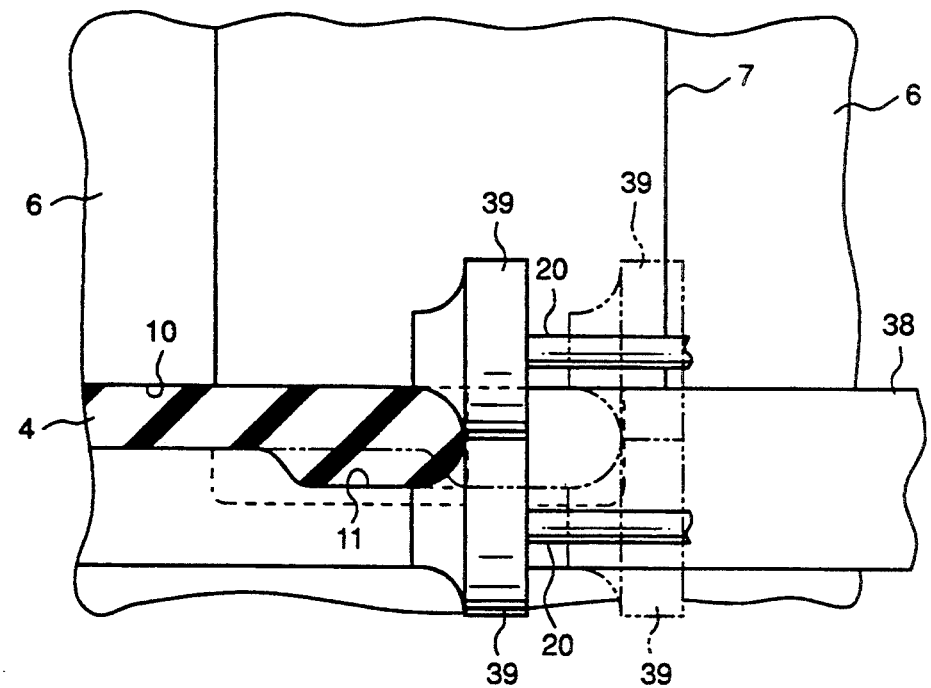
FIG. 19 is a front view of the extrusion apparatus of FIG. 16 illustrative of the extruding operation in a state in which a movable orifice plate and a forming roller have been moved towards a trim portion of the weather strip, wherein only the weather strip which is being extruded is shown in section.

Upon deciding that the time has come for reducing the width W of the lip 4 during the extrusion, the controller 49 suitably controls the drivers 46 to 48. More specifically, the controller 49 operates to activate the driver 48 so as to lower the piston 45. Consequently, the volume inside the cylinder 44 is increased so that the cylinder 44 receives and stores a greater amount of unvulcanized rubber flowing through the fourth passage 43, causing a reduction in the amount of discharge of the unvulcanized rubber from the fourth flow passage 43 and a corresponding reduction in the amount of discharge of the unvulcanized rubber from the opening 10. Referring to FIG. 19, after a certain time lag from the operation of the piston 45, the controller 49 operates to activate the drivers 46 and 47 so as to shift the movable orifice plate 38 and the forming rollers 39 inwardly (leftwardly as viewed in FIG. 19). The recess 11 for forming the thickened end portion 4a is also moved inwardly as a result of the inward movement of the movable orifice plate 38, with the result that the portion of the unvulcanized rubber corresponding to the thickened end portion 4a also is moved inwardly. In addition, the outer end portion of the unvulcanized rubber extruded from the opening 10, i.e., the portion corresponding to the extremity of the lip 4, is moved inwardly as a result of the inward movement of the forming rollers 39. Since the inward movement of the movable orifice plate 38 and the forming rollers 39 is conducted linearly or continuously, the width of the lip 4 is smoothly and continuously reduced along the length of the weather strip. The size of the space between the fixed orifice plate 7 and the movable orifice plate 38 is decreased when the width of the lip 4 is reduced. Nevertheless, the flow rate of the unvulcanized rubber extruded through the above-mentioned space is maintained substantially constant because the amount of discharge of the rubber through the opening 10 is also reduced.

Figure 23:
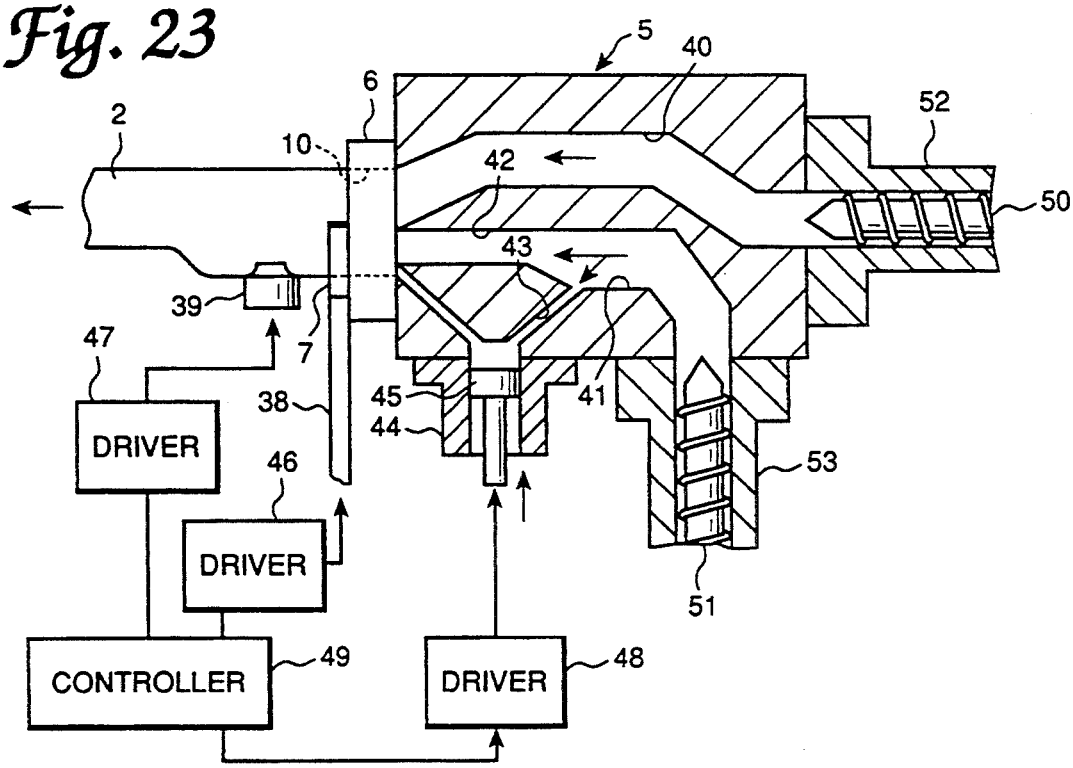
FIG. 23 is a schematic sectional plan view of the extrusion apparatus shown in FIG. 16 in a state in which a volume adjusting mechanism in a head has been set to provide minimum volume.

The controller, when determining that the time has come for recovering the original width W of the lip 4, operates to effect an operation reverse to that described above. Namely, the controller 49 activates the driver 48 to raise the piston 45 as shown in FIG. 23, so that the internal volume of the cylinder 44 decreases to displace unvulcanized rubber which has been stored in the cylinder 44. The unvulcanized rubber thus displaced from the cavity in the cylinder 44 is added to the unvulcanized rubber flowing through the fourth flow passage 43, so that the amount of the unvulcanized rubber discharged from the fourth flow passage 43 and, hence, the amount of discharge of the same from the opening 10 are increased. With a certain time lag after the operation of the piston 45, the controller 49 operates to activate the drivers 46 and 47 so that the movable orifice plate 38 and the forming rollers 39 are integrally moved outwardly (rightwardly as viewed in FIG. 19) together, whereby the lip 4 is formed to have a width which smoothly and continuously increases along the length of the weather strip. Thus, the end portion of the lip 4 is shifted inwardly or outwardly as desired as a result of the inward or outward movement of the movable orifice plate 38 and the forming rollers 39 together with each other, causing a change in the width W of the lip 4. The unvulcanized rubber is thus shaped into the final shape of the weather strip 2.

Figure 24:
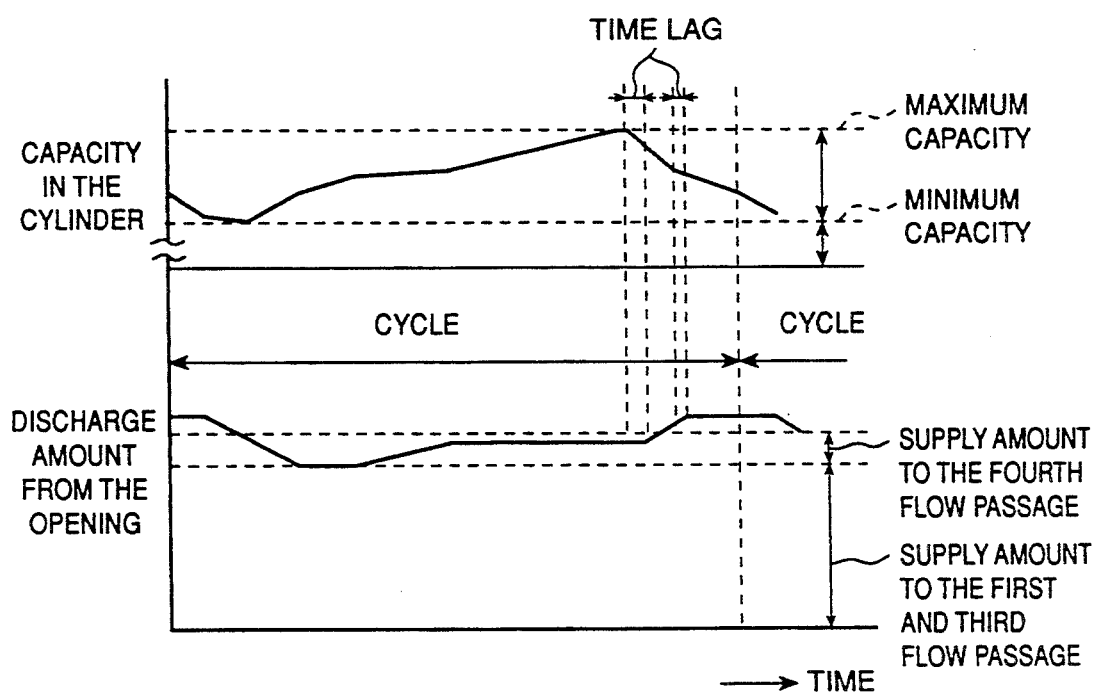
FIG. 24 is a time chart showing cyclic changes in the state of the volume adjusting mechanism inside the head and in the rate of discharge or displacement of the material from a head opening.

In the third embodiment as described, the internal volume or capacity of the cylinder 44 is minimized at least once in one cycle of the extruding operation as shown in FIG. 24, so that there is at least one moment or period at which the piston 45 expels all the unvulcanized rubber from the cylinder 44 into the fourth flow passage 43.

As explained before, the third embodiment as described involves a risk that the unvulcanized rubber passing the space between the fixed orifice plate 7 and the movable orifice plate undesirably flows into the gap between both orifice plates 7, 38 so as to form a burr D. Such a burr D, however, can be extinguished as the unvulcanized rubber extruded through the above-mentioned space between both orifice plates 7, 38 is then shaped by the peripheral surfaces of the pair of forming rollers 39 so that the extremity of the thickened end portion 4a can have a smoothly curved surface. Consequently, at least the visible side of the weather strip 2 is devoid of any burr D, so that the appearance of the weather strip and, hence, the appearance of the vehicle, is improved while sufficient functioning of the lip 4 is ensured.

In the third embodiment as described, the width W of the lip 4 is adjusted by moving the movable orifice plate 38, so that an amount of unvulcanized rubber to be wasted is reduced as compared with the case where the lip width W is adjusted by severing the vulcanized rubber by a cutter.

It is also to be noted that the head 5 in the third embodiment has a function for suppressing variation of the internal pressure of the extrusion apparatus which is caused by the movement of the movable orifice plate 38. Namely, a volume adjusting mechanism including the cylinder 44 and the piston 45 is associated with the fourth flow passage 43 which is subjected to the greatest change in the internal pressure caused by the movement of the movable orifice plate among the four flow passages 40, 41, 42 and 43 formed in the head 5. The total internal volume of the head 5 is adjusted by suitably controlling the position of the piston 45 in the cylinder 44 by the controller 49 when the latter has judged that operation for changing the width W of the lip 4 is to be started. Consequently, the amount of discharge of the unvulcanized rubber is appropriately controlled so as to maintain a substantially constant flow velocity of the unvulcanized rubber, despite any change in the area of the space between the fixed orifice plate 7 and the movable orifice plate 39. It is therefore possible to avoid any deformation of the lip 4 which otherwise may be caused when there is a drastic change in the flow velocity.

Although the movable orifice plate 38 and the pair of forming rollers 39 have been stated as being movable together with each other, such a synchronous movement is not essential and the arrangement may be such that the movable orifice plate 38 and the pair of forming rollers 39 are movable independently of each other, e.g., with a certain time lag between the movement of the movable orifice plate 38 and the pair of forming rollers 39.

The dual arrangement of extruder 52, 53 also is illustrative, and the extrusion apparatus of the invention may employ only one extruder.

It is also to be understood that the extrusion apparatus of the present invention may be devoid of the described mechanism for suppressing, through adjusting the internal volume of the head 5, variations in the internal pressure and, hence, of the flow velocity of unvulcanized rubber. Namely, the mechanism for adjusting the internal volume of the head may be omitted provided that an amount of variation of the width W of the lip 4 is so small that only slight variation is caused in the internal pressure.

Furthermore, although each of the described embodiments employ the fixed orifice plate which is fixed in contact with the front face of the main die plate 6, the use of such a separate fixed orifice plate is not essential: namely fixed orifice plate 7 may be integrated with the main die plate 6.

What is claimed is:

1. A method for forming an extruded weather strip having a trim portion of a substantially U-shaped cross-section, and adapted to be secured to a vehicle body, and a lip, having a width which varies according to a location along a length of said weather strip, said lip having a thickened end portion, the method comprising the steps of:

extruding unvulcanized rubber through a head mounted on a downstream end of an extruder;

roughly shaping the extruded unvulcanized rubber by causing the extruded unvulcanized rubber to move through an opening formed in a main die plate disposed downstream of said head so as to shape a portion of said extruded unvulcanized rubber corresponding to said trim portion of said weather strip into a shape substantially conforming with a shape of said trim portion to be finally obtained, and a portion of said extruded unvulcanized rubber corresponding to said lip into a shape having a width not smaller than a maximum width of said lip to be finally formed;

forming said thickened end portion by causing the shaped unvulcanized rubber to pass through a space defined by a movable orifice plate which is disposed downstream of said main die plate and which includes a recess configured substantially in conformity with the shape of said thickened end portion, while moving said movable orifice plate in the width direction of said weather strip; and shaping an extremity of said lip by further advancing said shaped unvulcanized rubber through an end shaping device, disposed downstream of said movable orifice plate, defining a shape corresponding to a shape of an end of said lip to be finally obtained, while moving said end shaping device substantially together with said movable orifice plate, wherein said step of forming the thickened end portion further includes a step of adjusting the volume of unvulcanized rubber as it flows in passages defined in said head.

2. A method according to claim 1, wherein said step of shaping the end of said lip includes the step of using said shaping device comprising a roller cutter disposed downstream of said movable orifice plate, said roller cutter having a peripheral cutting blade an edge of which is in contact with or positioned in close proximity to a pedestal plate which extends from said movable orifice plate and which is flush with the upper face of said recess.

3. A method according to claim 1, wherein said step of shaping the end of said lip includes the step of using said shaping device comprising upper and lower roller cutters arranged in a pair at a downstream side of said movable orifice plate, said cutter rollers being held in contact with each other at edges of peripheral cutting blades formed thereon.

4. A method according to claim 1, wherein said step of shaping the end of said lip includes the step of using said shaping device comprising upper and lower forming rollers arranged in a pair in contact with each other downstream of said movable orifice plate, said forming rollers having peripheral surfaces which define a shape conforming with an arcuate shape of an extremity of said thickened end portion.

5. A method for forming an extruded weather strip adapted to be secured to a vehicle body and having a cross-section which varies according to a location along a length of said weather strip, the method comprising the steps of:

extruding unvulcanized rubber through a head mounted on a downstream end of an extruder;

shaping the extruded unvulcanized rubber so as to have a maximum cross-sectional area and a cross-sectional area less than said maximum cross-sectional area by causing the extruded unvulcanized rubber to move through an opening formed in a main die plate disposed downstream of said head; and forming said shaped unvulcanized rubber by causing said shaped unvulcanized rubber to pass through a space defined by a movable orifice plate disposed downstream of said main die plate while moving said movable orifice plate in a direction to change the cross-sectional area of said shaped unvulcanized rubber, said forming step including the step of changing a volume of unvulcanized rubber as it flows in passages provided in said head.

6. A method according to claim 1, wherein the change in volume of said passages is conducted such that said volume is minimized at least once in one cycle of the extruding operation.

7. An extrusion forming apparatus for forming a weather strip having a trim portion of a substantially U-shaped cross-section and adapted to be secured to a vehicle body and a lip, having a width which varies according to a position along a length of said weather strip, said lip having a thickened end portion, said apparatus comprising:

a head disposed on a downstream end of an extruder and having at least one passage formed therein for allowing an unvulcanized rubber to pass therethrough;

a main die plate disposed downstream of said head and having an opening including first and second opening portions which respectively correspond to said trim portion and said lip of said weather strip, said second opening portion having a width not smaller than the width of said lip to be formed;

a movable orifice plate disposed downstream of said main die plate and having a recess configured substantially in conformity with the shape of said thickened end portion;

lip end shaping means disposed downstream of said movable orifice plate for movement in a width direction of said weather strip for shaping an end of said lip, said lip end shaping means having an inner contour portion corresponding to the shape of the end of said lip;

driving means for simultaneously driving said movable orifice plate and said lip end shaping means in the width direction of said weather strip; and control means for controlling the timing of operation of said driving means, wherein said head has at least one passage formed therein with an internal volume through which unvulcanized rubber moves, said apparatus further comprising a device, connected to the head, and having a piston and cylinder, said cylinder being associated with said at least one passage, an internal volume of the cylinder being changed upon movement of said cylinder.

8. An apparatus according to claim 7, wherein said lip end shaping means includes a roller cutter disposed downstream of said movable orifice plate, said roller cutter having a peripheral cutting blade, the edge of which is in contact with or positioned in close proximity to a pedestal plate which extends from said movable orifice plate and which is flush with an upper face of said recess.

9. An apparatus according to claim 7, wherein said lip end shaping means includes upper and lower roller cutters arranged in a pair at a downstream side of said movable orifice plate, said cutter rollers being held in contact with each other at edges of peripheral cutting blades formed thereon.

10. An apparatus according to claim 7, wherein said lip end shaping means includes upper and lower forming rollers arranged in a pair in contact with each other downstream of said movable orifice plate, said forming rollers having peripheral surfaces which define a shape conforming with an arcuate shape of an extremity of said thickened end portion.

11. An apparatus according to claim 7, wherein said head has a plurality of passages for said unvulcanized rubber, one of said passages communicating with said second opening portion of said opening corresponding to said lip.

12. An apparatus according to claim 11, further comprising a cylinder-piston device capable of changing internal volume of a cylinder and connected to passage communicating with said second opening portion corresponding to said lip.

13. A method according to claim 5, wherein the change in volume of said passages is conducted such that said volume is minimized at least in one cycle of the extruding operation.

* * * * *